(12) United States Patent
Elliott

(10) Patent No.: US 8,668,042 B2
(45) Date of Patent: Mar. 11, 2014

(54) SYSTEM AND METHOD FOR CONTROLLING HYDRAULIC SYSTEM BASED ON TEMPERATURE

(75) Inventor: Christopher M. Elliott, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 13/305,811

(22) Filed: Nov. 29, 2011

(65) Prior Publication Data

US 2013/0133972 A1    May 30, 2013

(51) Int. Cl.
*F16H 39/02* (2006.01)

(52) U.S. Cl.
USPC ............ 180/339; 180/307; 180/308; 180/367

(58) Field of Classification Search
USPC ................. 180/305, 307, 308, 338, 339, 367
See application file for complete search history.

(56) References Cited

U.S. PATENT DOCUMENTS

| | | | |
|---|---|---|---|
| 5,352,095 A * | 10/1994 | Tanaka et al. | 417/12 |
| 5,390,759 A | 2/1995 | Gollner | |
| 5,758,499 A * | 6/1998 | Sugiyama et al. | 60/450 |
| 5,941,689 A | 8/1999 | Skirde | |
| 6,339,928 B1 | 1/2002 | Gollner | |
| 6,799,950 B2 | 10/2004 | Meier et al. | |
| 6,966,180 B2 * | 11/2005 | Deneir et al. | 60/327 |
| 7,565,943 B2 * | 7/2009 | Herrmann et al. | 180/305 |
| 8,403,098 B2 * | 3/2013 | Lunzman et al. | 180/307 |
| 2006/0191732 A1 * | 8/2006 | Lunzman et al. | 180/307 |
| 2008/0128189 A1 | 6/2008 | Pruitt et al. | |
| 2008/0236153 A1 * | 10/2008 | St. Aubin et al. | 60/327 |
| 2009/0235655 A1 | 9/2009 | Koehler et al. | |
| 2009/0238696 A1 * | 9/2009 | Satake et al. | 417/34 |

* cited by examiner

*Primary Examiner* — John Walters
*Assistant Examiner* — Brian Swenson
(74) *Attorney, Agent, or Firm* — Finnegan, Henderson, Farabow, Garrett & Dunner LLP

(57) ABSTRACT

A hydraulic system includes a hydraulic transmission including a hydraulic pump configured to be coupled to a prime mover, a hydraulic motor configured to be coupled to an output shaft, and fluid lines coupling the hydraulic pump to the hydraulic motor to provide a fluid circuit providing flow communication between the hydraulic pump and the hydraulic motor, such that operation of the hydraulic pump provides fluid flow to the hydraulic motor, and the hydraulic motor supplies torque to the output shaft. A controller is configured to control operation of the hydraulic transmission. The controller is configured to receive signals indicative of pressure in the fluid circuit and reduce an output of the hydraulic pump when the pressure in the fluid circuit reaches a pressure level, and a rate of response of the reduction of the output of the hydraulic pump is varied based on a temperature of fluid in the fluid circuit.

18 Claims, 2 Drawing Sheets ial pile US 8,668,042 B2

SYSTEM AND METHOD FOR CONTROLLING HYDRAULIC SYSTEM BASED ON TEMPERATURE

TECHNICAL FIELD

The present disclosure is directed to a system and method for controlling a hydraulic system and, more particularly, to a system and method for controlling a hydraulic system based on temperature.

BACKGROUND

Machines may include one or more hydraulic circuits for operation of the machine, including a hydraulic transmission for providing propulsion for the machine. The hydraulic transmission may include one or more hydraulic circuits including a hydraulic pump and a hydraulic motor. For example, some machines may include a variable displacement hydraulic pump and/or a variable displacement hydraulic motor. The hydraulic pump may be driven by a prime mover. By varying the displacement and/or speed of the hydraulic pump, the amount of fluid pumped to the hydraulic motor may be controlled. Fluid pumped through the hydraulic motor causes it to spin an output shaft coupled to one or more ground engaging members, such as wheels and/or tracks. By varying the ratio between the displacement of the hydraulic pump and the displacement of the hydraulic motor, the speed at which the hydraulic motor drives the output shaft may be controlled.

Under certain operational conditions, pressure may build in the hydraulic circuit to a level higher than desired, and thus, it may be desirable to regulate the pressure in the hydraulic circuit. For example, when the movement of the machine is inhibited by an external resistance, pressure may build within the hydraulic circuit that drives a ground engaging member, for example, when the machine pushes against a large pile of earth. This may result in travel of the machine being slowed or stopped. The slowing or stopping of the machine may cause the ground engaging member to also be slowed or stopped, which, in turn, slows or stops the hydraulic motor that turns the ground engaging member. As the hydraulic motor is slowed or stopped, the flow of fluid through the hydraulic motor may be substantially inhibited, while the flow of fluid supplied from the hydraulic pump may continue at substantially the same flow rate. As a result, the pressure in the circuit may increase beyond desired levels, which may be related to machine design limits and/or the physical characteristics of the fluid in the hydraulic circuit.

Systems have been developed that reduce pressure in hydraulic circuits. For example, U.S. Pat. No. 5,941,689, issued on Aug. 29, 1999, to Skirde (the '689 patent), discloses a control system for a variable pump and a process to control the variable pump. A circuit includes the variable pump, which is connected to a hydraulic motor by working lines having check valves in the circuit to allow oil flow from a charge pump to the circuit. The circuit also includes high pressure relief valves to allow oil flow out of the working lines to limit maximum pressure. A temperature sensor is placed between the high pressure relief valves and the check valves. According to the system and method of the '689 patent, a signal is processed in an electronic control to control the displacement of a variable pump, depending on the temperature of the fluid flowing across the high pressure relief valves.

Although the system and method disclosed in the '689 patent may serve to limit the maximum pressure in the circuit, the system and method may result in unsatisfactory performance of the circuit. For example, the pressure in the circuit may be reduced in a manner that unnecessarily reduces the circuit's responsiveness to operator commands. Therefore, it may be desirable to provide a system and method for controlling a hydraulic system in manner that results in desirable operation of a machine while maintaining the pressure in the hydraulic circuit within desired levels.

SUMMARY

In one aspect, the present disclosure includes a hydraulic system including a hydraulic transmission. The hydraulic transmission includes a hydraulic pump configured to be coupled to a prime mover, a hydraulic motor configured to be coupled to an output shaft, and fluid lines coupling the hydraulic pump to the hydraulic motor to provide a fluid circuit providing flow communication between the hydraulic pump and the hydraulic motor, such that operation of the hydraulic pump provides fluid flow to the hydraulic motor, and the hydraulic motor supplies torque to the output shaft. The hydraulic system further includes a controller configured to control operation of the hydraulic transmission. The controller is configured to receive signals indicative of pressure in the fluid circuit and reduce output of the hydraulic pump when the pressure in the fluid circuit reaches a pressure limit, and wherein a rate of response of the reduction of the output of the hydraulic pump is varied based on a temperature of fluid in the fluid circuit.

According to another aspect, the disclosure includes a method for controlling a hydraulic system including a hydraulic pump, a hydraulic motor, and fluid lines coupled to the hydraulic pump and the hydraulic motor to provide a fluid circuit providing fluid flow between the hydraulic pump and the hydraulic motor. The method includes receiving a signal indicative of pressure in the fluid circuit, and reducing an output of the hydraulic pump when the pressure in the fluid circuit reaches a first pressure limit, wherein a rate of response of the reduction of the output of the hydraulic pump is varied based on a temperature of fluid in the fluid circuit.

According to a further aspect, the disclosure includes a machine including an operator interface for controlling operation of the machine, a prime mover for providing power to the machine, at least two ground engaging members for propelling the machine across terrain, and a hydraulic transmission coupled to the prime mover and the ground engaging members. The hydraulic transmission includes a hydraulic pump coupled to the prime mover, a hydraulic motor coupled to at least one of the ground engaging members, and fluid lines coupling the hydraulic pump to the hydraulic motor to provide a fluid circuit providing flow communication between the hydraulic pump and the hydraulic motor, such that operation of the hydraulic pump provides fluid flow to the hydraulic motor, and the hydraulic motor supplies torque to the ground engaging members. The hydraulic transmission further includes a controller configured to control operation of the hydraulic transmission, wherein the controller is configured to receive signals indicative of pressure in the fluid circuit and reduce an output of the hydraulic pump when the pressure in the fluid circuit reaches a pressure limit, and wherein a rate of response of the reduction of the output of the hydraulic pump is varied based on a temperature of fluid in the fluid circuit.

DETAILED DESCRIPTION

Figure 1:
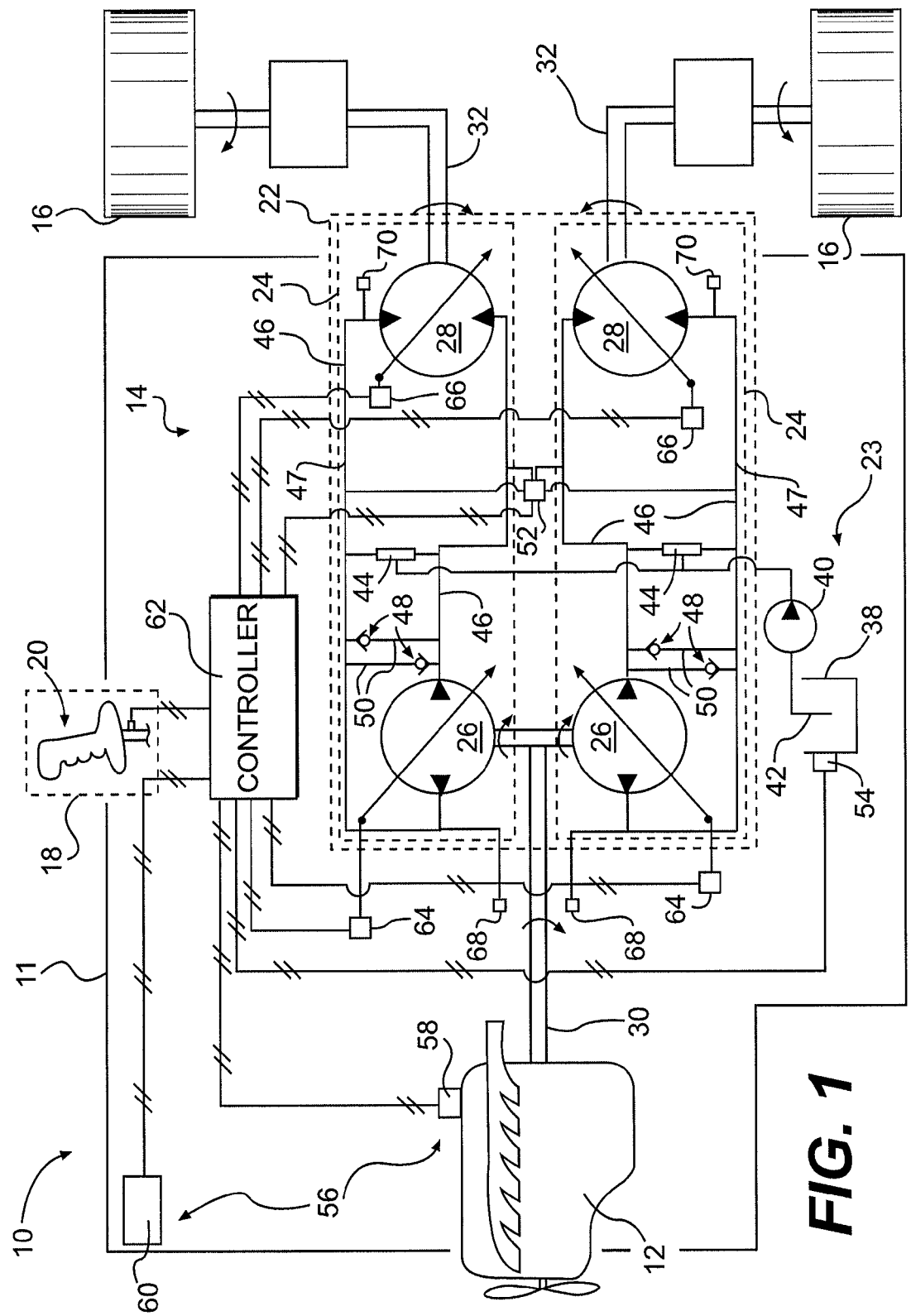
FIG. 1 is a schematic diagram of an exemplary embodiment of a machine.

FIG. 1 schematically illustrates an exemplary embodiment of a machine 10. Exemplary machine 10 may include a chassis 11, a prime mover 12, and a power train 14 coupled to chassis 11. Power train 14 operably couples prime mover 12 to one or more ground engaging members 16 configured to propel machine 10. Exemplary machine 10 further includes an operator interface 18, including one or more control devices configured to permit an operator to control the speed and/or direction of the machine's path of travel. For example, operator interface 18 may include a control device 20 configured to control the speed and/or direction of travel of machine 10. FIG. 1 schematically depicts an exemplary control device 20 including a single lever, but control device 20 may be any device for use by an operator, either directly or remotely, for controlling the speed and/or travel path of machine 10, such as, for example, one or more joy-sticks, one or more hand-operated or foot-operated levers, and a steering wheel.

Machine 10 may be any type of ground-borne vehicle, such as, for example, an automobile, a truck, an agricultural vehicle, and/or a construction vehicle, such as, for example, a wheel loader, a dozer, a track-type tractor, an excavator, a grader, an on-highway truck, an off-highway truck, and/or any other vehicle type known to a person skilled in the art. Moreover, prime mover 12 may be any device that generates power, such as, for example, an internal combustion engine, including but not limited to spark-ignition engines, compression-ignition engines, rotary engines, gas turbine engines, and/or engines powered by gasoline, diesel fuel, bio-diesel, ethanol, methanol, and combinations thereof; hydrogen-powered engines; fuel cells; solar cells; and/or any other power source known to a person skilled in the art. Further, ground engaging members 16 may include wheels, tracks, belts, tires, and/or any other device(s) for propelling a machine known to a person skilled in the art.

Power train 14 may include one or more transmissions 22 configured to operably couple power source 12 to drive members 16. For example, transmission 22 may include a hydraulic system 23 including a hydraulic transmission, such as, for example, any transmission that uses fluid flow to transfer power between a power source and ground engaging members. For example, transmission 22 may be a continuously-variable transmission, such as, for example, a hydraulic transmission that includes a hydraulically-operated pump and a hydraulically-operated motor, sometimes referred to as a "hydrostatic" transmission.

In the exemplary machine 10 shown in FIG. 1, transmission 22 includes two hydrostatic transmissions 24, each configured to supply power to one of ground engaging members 16. For example, a track-driven vehicle such as a track-type tractor may include a separate hydrostatic transmission 24 for each ground engaging member 16 (e.g., each track). A wheeled vehicle, such as a wheel loader, may include either a single hydrostatic transmission 24, which drives a pair of wheels, or it may include a separate hydrostatic transmission 24 for two or more of its four wheels.

As illustrated in FIG. 1, exemplary machine 10 includes a dual-path transmission configuration, which includes two hydrostatic transmissions 24. Each hydrostatic transmission 24 is operably coupled to prime mover 12, and includes a hydraulic pump 26 fluidly coupled to a hydraulic motor 28 via a hydraulic circuit or loop. Pump 26 and/or motor 28 may be variable displacement, variable delivery, fixed displacement, or any other configuration known in the art. Pump 26 is operably coupled to prime mover 12, for example, via an input shaft 30. Alternatively, pump 26 may be operably coupled to prime mover 12 via a torque converter (not shown), a clutch (not shown), a gear box (not shown), or in any other manner known in the art. Hydrostatic transmission 24 may also include an output shaft 32 operably coupling motor 28 to one of ground engaging members 16 via, for example, a final drive 34. Final drive 34 may include a reduction gear arrangement, such as, for example, a bevel gear assembly, spur gear assembly, planetary gear assembly, and/or any other assembly known to those having skill in the art that provides a speed reduction.

Exemplary hydraulic system 23 may include a reservoir 38 configured to supply hydraulic fluid to hydraulic system 23 via a charging pump 40 and a source line 42. Pump 26 may be configured to draw hydraulic fluid from reservoir 38, via source line 42, with the assistance of charging pump 40 and a shuttle valve 44. Pump 26 may be further configured to supply hydraulic fluid to hydraulic motor 28, along hydraulic lines 46. Pump 26, motor 28, and hydraulic lines 46 of a given hydrostatic transmission 24 may form a closed fluid circuit 47 in which one of hydraulic lines 46 carries fluid from pump 26 to motor 28, and the other of hydraulic lines 46 returns hydraulic fluid from motor 28 to pump 26. Hydraulic fluid flowing through motor 28 causes motor 28 to rotate, which results in supplying torque to output shaft 32. The direction of fluid flow in fluid circuit 47 is reversible, such that output shaft 32 may be driven in two directions, thereby providing machine 10 with the ability to be driven in either a forward or reverse direction, perform pivot turns, and/or counter-rotate (i.e., operate such that drive members 16 on opposite sides of machine 10 rotate in opposite directions).

Hydrostatic transmission 24 may include cross-over relief (COR) valves 48 configured to relieve pressure within fluid circuit 47 when pressure within fluid circuit 47 (e.g., in hydraulic lines 46) exceeds a pressure limit. The pressure limit may be variable and/or adjustable, as discussed in more detail below. COR valves 48 may be configured to direct fluid from a side of fluid circuit 47 experiencing higher pressure to a side of fluid circuit 47 experiencing a lower pressure. For example, hydraulic fluid may be directed via a COR line 50 from one of hydraulic lines 46 (i.e., a hydraulic line experiencing higher pressure) to another of hydraulic lines 46 that has a lower pressure.

Exemplary machine 10 may include one or more sensors configured to provide a signal indicative of a parameter related to pressure in the hydrostatic transmission 24. For example, machine 10 may include a sensor 52 configured to provide a signal indicative of pressure in fluid circuit 47 and/or a sensor 54 configured to provide a signal indicative of the temperature of the fluid in fluid reservoir 38 of hydraulic system 23. Machine 10 may also include one or more sensors related to the operation of prime mover 12, such as, for example, engine control sensors 56, which may include, for example, an engine speed sensor 58 and/or a throttle input sensor 60.

According to some embodiments, sensor 52 may include a fluid pressure sensor and may be provided in fluid circuit 47 at a location between pump 26 and motor 28. For example, a single pressure sensor 52 may be configured to determine a highest pressure of the hydraulic fluid at a location between multiple pumps and the hydraulic motors associated with each pump. Alternatively, each hydrostatic transmission 24 and/or each hydraulic line 46 located between the pump 26 and motor 28 of each hydrostatic transmission 24 may include a separate pressure sensor 52. According to some embodiments, sensor 52 may include a temperature sensor and may be provided in fluid circuit 47 at a location between pump 26 and motor 28. For example, a single temperature sensor 52 may be configured to determine the temperature of the hydraulic fluid at a location between multiple pumps and the hydraulic motors associated with each pump. Alternatively, each hydrostatic transmission 24 and/or each hydraulic line 46 located between pump 26 and motor 28 of each hydrostatic transmission 24 may include a separate temperature sensor.

According to the exemplary embodiment shown, machine 10 includes a controller 62. As shown in FIG. 1, controller 62 may be configured to control operation of prime mover 12 and/or power train 14. For example, controller 62 may be configured to control transmission 22 by supplying control signals for operation of pumps 26 and motors 28. In particular, controller 62 may control fluid flow in transmission 22 by, for example, controlling displacement and/or speed of pumps 26 and/or motors 28. In particular, transmission 22 may include a pair of pump actuator devices 64 (e.g., including solenoid and spool valve assemblies) configured to vary the displacement of pumps 26. Transmission 22 may further include a pair of motor actuator devices 66 (e.g., including solenoid and spool valve assemblies) configured to vary the displacement of motor 28.

According to some embodiments, sensors 68 may be provided for one or more of pumps 26 for supplying signals indicative of the flow rate of fluid through pumps 26, such as, for example, sensors for supplying signals indicative of the displacement and/or speed of pumps 26, and/or flow meters. Similarly, sensors 70 may be provided for one or more of motors 28 for supplying signals indicative of the flow rate of fluid through motors 28, such as, for example, sensors for supplying signals indicative of the displacement and/or speed of motors 28, and/or flow meters.

Controller 62 may control displacement of pumps 26 and motors 28 based on signals received from one or more of operator interface 18, sensors 52, sensor 54, engine control sensors 56, sensors 64, sensors 66, sensors 68, and sensors 70. Such signals may be in the form of digital, analog, mechanical, and/or hydraulic signals. For example, control device 20 may provide a signal indicative of an operator's speed and/or steering command that is received by controller 62. Further, sensors 52 may provide a signal indicative of a parameter related to pressure and/or temperature in fluid circuit 47, and/or sensor 54 may provide a signal indicative of the temperature of the fluid in reservoir 38. One of more of these signals from the sensors may be received by controller 62. Controller 62 may be configured to control fluid flow in transmission 22 based, at least in part, on the signals received from operator interface 18 and one or more of the sensors. By controlling the fluid flow, controller 62 may operate to control the magnitude of the power supplied to one or more of drive members 16.

For example, according to some embodiments, controller 62 may be configured to reduce the output of transmission 22 in response to sensors 52, sensor 54, and/or sensors 68 and 70. In particular, controller 62 may be configured to operate such that when the pressure and/or temperature measured in fluid circuit 47 reaches a limit value or values, controller 62 reduces the stroke of pumps 26 and/or motors 28, so that pressure and/or temperature in the fluid circuit 47 does not exceed the limit value(s). According to some embodiments, the power output of transmission 22 may be dependent on a ratio between the displacement of pumps 26 and the displacement of motors 28, and controller 62 may be configured to control the ratio between the displacement of pumps 26 and the displacement of motors 28.

Controller 62 may include any components that may be used to run an application, such as, for example, a memory, a secondary storage device, and/or a central processing unit. According to some embodiments, controller 62 may include additional or different components, such as, for example, mechanical and/or hydro-mechanical components. Various other known components may be associated with controller 62, such as, for example, power supply circuitry, signal-conditioning circuitry, solenoid driver circuitry, and/or other appropriate circuitry. Such circuits may be electrical and/or hydro-mechanical.

According to some embodiments of machine 10, machine 10 may be controlled via operator interface 18, so that machine 10 is propelled via prime mover 12 and power train 14 in a straight-line travel path and in curved travel paths, which curve to the right or left. For example, prime mover 12 and/or transmission 22 may be operated such that substantially equal amounts of power are supplied via hydrostatic transmissions 24 to drive members 16 on opposite sides of machine 10, thereby propelling machine 10 in a substantially straight-line travel path. Moreover, a hydrostatic transmission 24 located on one side of machine 10 may be operated to supply more power and/or force to its corresponding drive member 16 than a hydrostatic transmission 24 located on the opposite side of machine 10 supplies to its corresponding drive member 16. In this manner, machine 10 may be steered and propelled in a curved path, at a radius having a center on the same side of machine 10 as the drive member 16 that receives less power and/or force. Alternatively, or in addition, steering may be accomplished via pivoting of one or more drive members 16, for example, similar to a conventional automobile's front wheels. Further, machine 10 may alternatively, or additionally, include an articulated chassis (not shown), and steering may be executed via pivoting of the chassis at its point of articulation.

Controller 62 may be configured to operate pump 26 and/or motor 28 to prevent excessive pressure and/or temperature in fluid circuit 47. For example, if machine 10 is travelling across terrain and meets sufficient resistance to continued travel, the motion of one or more ground engaging members 16 may be inhibited, for example, if machine 10 is a dozer and pushes against a pile of earth. As the speed of one or more of the ground engaging members 16 is reduced due to such an external force, the speed of motor 28 coupled to the slowed ground engaging member 16 is reduced, thereby reducing the amount of fluid flowing through the motor 28. If pump 26 associated with the slowed motor 28 continues to operate at the same commanded speed and displacement, however, pressure increases in the fluid circuit 47 associated with pump 26 and motor 28 due to the difference in output between pump 26 and motor 28. In particular, pump 26 is providing a higher flow rate than motor 28, and thus, pressure and/or temperature of the fluid in fluid circuit 47 increases. If the pressure and/or temperature reaches excessive levels, components of power train 14 may be subjected to excessive wear rates. For example, excessive temperature may result in breakdown of the fluid in fluid circuit 47, reducing its viscosity, or may result in damage to fluid seals or other components of power train 14.

In the exemplary power train 14 shown in FIG. 1, one or more of COR valves 48 may be configured to relieve pressure in fluid circuits 47 by directing fluid from the side of fluid circuit 47 experiencing higher pressure to a side of fluid circuit 47 experiencing a lower pressure. For example, hydraulic fluid may be directed via a COR line 50 from one of lines 46 experiencing higher pressure to another of the lines 46 that has a lower pressure. However, unless the output of pump 26 is reduced, the power supplied by pump 26 but not consumed by the associated motor 28 due to its reduced output increases the temperature of the fluid in fluid circuit 47. Thus, in order to prevent the fluid from reaching excessive temperatures (e.g., about 115 degrees C. for a 10-weight fluid), controller 62 may operate to reduce the output of pump 26 until the pressure in fluid circuit 47 drops below the pressure level at which the COR valves 48 open, for example, to a pressure about 20 bar below the pressure level at which the COR valves 48 open. As a result, the COR valve 48 associated with the affected fluid circuit 47 closes, and the pump 26 is operated at a reduced level.

Operating in the exemplary manner described above, controller 62 is configured to react to excessive pressure in fluid circuit 47 at rate of response K that substantially ensures that components of power train 14 are not damaged due to excessive pressure and/or temperature in fluid circuits 47. The rate at which controller 47 responds to excessive pressure may substantially affect the manner in which machine 10 operates and responds to operator commands. Thus, if controller 62 responds to excessive pressure at an unnecessarily high rate of response, machine 10 may operate in an unresponsive or halting manner when encountering high resistance to travel. On the other hand, if controller 62 responds to excessive pressure at an insufficiently high rate of response, excessive wear to components of power train 14 may result.

According to some embodiments, controller 62 may be configured to respond to high pressure in fluid circuits 47 at a rate of response based on the temperature of fluid in one or more of fluid circuits 47. For example, if the temperature in fluid circuit 47 is sufficiently below a critical temperature (e.g., the temperature at which the viscosity of the fluid breaks down), fluid circuit 47 may be operated at an elevated pressure for a significant period of time, for example, until the temperature of the fluid in fluid circuit 47 approaches the critical temperature. On the other hand, if the temperature of the fluid in fluid circuit 47 is close to the critical temperature, it may be desirable to quickly reduce the pressure in fluid circuit 47 in order to avoid excessive wear to components of power train 14. In particular, the controller 62 may send signals to pump 26 to reduce its displacement and/or speed, thereby reducing the pressure and/or temperature of the fluid in fluid circuit 47.

Figure 2:
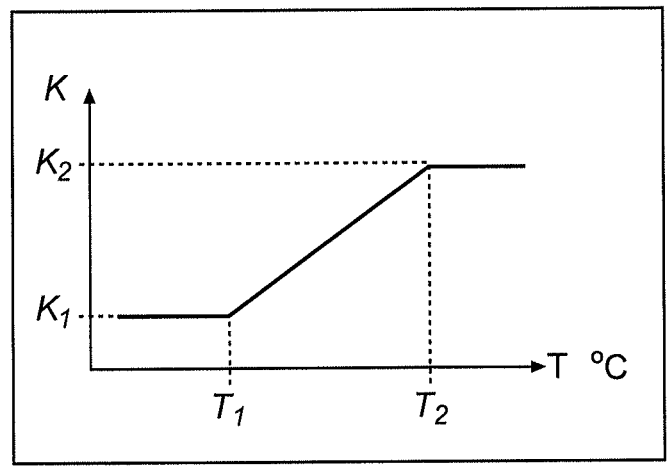
FIG. 2 is graph showing an exemplary relationship between the rate of response of reducing pressure in an exemplary fluid circuit as a function of the temperature of the fluid in the fluid circuit.

For example, FIG. 2 is graph showing an exemplary relationship between the rate of response K of reducing pressure in fluid circuit 47 as a function of the temperature of the fluid in the fluid circuit 47. As shown in FIG. 2, if the temperature of the fluid in fluid circuit 47 is below a first temperature $T_1$, the rate of response K may remain relatively constant and low, for example, at a minimum value $K_1$. If the temperature of the fluid in fluid circuit 47 reaches $T_1$, however, the rate of response K may begin to rise, for example, in a substantially linear fashion. As the temperature of the fluid in fluid circuit 47 continues to increase, the rate of response K continues to increase until the temperature of the fluid in fluid circuit 47 reaches a second temperature $T_2$. In the example shown, at T2, the rate of response K reaches its maximum value of $K_2$. Thus, as the temperature of the fluid in fluid circuit 47 increases, the rate of response K increases, for example, so that the displacement and/or speed of pump 26 is decreased substantially immediately until the pressure in fluid circuit 47 drops to a more desirable level.

In the example shown in FIG. 2, the rate of change of the rate of response increases at relatively constant rate between $T_1$ and $T_2$. However, the rate of change of the rate of response may not be relatively constant in this region. For example, the rate of response may vary in a non-linear fashion based at least in part on temperature. According to some embodiments, the rate of response may vary based on the rate of change of the temperature and/or whether the temperature is rising or falling. According to some embodiments, the rate of response may be predetermined and stored in tables and/or maps providing correlations between the rate of response and temperature. According to some embodiments, factors other than temperature may affect the rate of response.

According to some embodiments, the temperatures $T_1$ and $T_2$ may be selected based on design considerations, such as, for example, the temperature at which the fluid in fluid circuit 47 begins to degrade. For example, if the fluid in fluid circuit 47 is rated to operate at temperatures up to about 115 degrees C., such that the fluid substantially maintains its viscosity at the rated temperature, the second temperature $T_2$ may be set to about 115 degrees C. For such an example, if controller 62 determines that the temperature of the fluid is at about $T_2$, controller 62 may be configured to respond at its maximum rate to reduce the pressure in fluid circuit 47. For example, controller 62 may send one or more signals to pump actuator device 64 to reduce the displacement and/or speed of pump 26, thereby reducing the pressure in fluid circuit 47. This rapid rate of response K may serve to reduce the temperature of the fluid, prevent breakdown of the fluid, and/or prevent excessive wear rates for components of power train 14.

In contrast, if controller 62 determines that the temperature of the fluid is at about $T_1$, which may correspond to, for example, about 50 degrees C., a temperature well below the maximum operating temperature of the fluid, controller 62 may be configured to respond at its minimum response rate K and slowly reduce the pressure in fluid circuit 47. For example, controller 62 may send one or more signals to pump actuator device 64 to slowly reduce the displacement and/or speed of pump 26, thereby reducing the pressure in fluid circuit 47. By virtue of responding slowly to the high pressure in fluid circuit 47, controller 62 may enable continued operation of machine 10 according to an operation requested by the operator for a longer period of time and/or more consistently. This may result in machine 10 being more responsive to operator commands over a wider range of operating conditions, resulting in more effective operation of machine 10.

According to some embodiments, the temperature of the fluid in fluid circuit 47 may be determined directly via one or more of sensors 52, which provide signals indicative of the temperature of the fluid in fluid circuits 47 to controller 62. In such embodiments, controller 62 may control operation of transmission 22 based on the directly-measured temperature of the fluid in fluid circuits 47.

According to some embodiments, the temperature of fluid in fluid circuits 47 may not be determined by direct measurement using sensors 52. Rather, the temperature of the fluid in fluid circuits 47 may be estimated by controller 62. This may be desirable in systems not having sensors for directly measuring the temperature of the fluid due to, for example, reduced costs, difficulty providing seals for such sensors, and/or difficulties with reliably measuring the fluid temperature in the high temperature and high pressure environment of fluid circuits 47.

According to some embodiments, controller 62 may be configured to estimate the temperature of the fluid in fluid circuits 47 based on one or more of the temperature of the fluid in reservoir 38 based on signals received from sensor 54, and, for example, the difference in the flow rate of fluid through pump 26 and the flow rate of fluid through associated motor 28. For example, controller 62 receives signals indicative of the temperature $T_R$ of the fluid in reservoir 38 from sensor 54 and signals indicative of flow rates through pump 26 and motor 28 from sensors 68 and 70, and estimates the temperature $T_{FC}$ of the fluid in fluid circuit 47 based on the temperature $T_R$ of the fluid in reservoir 38 and the difference in flow rates of fluid through pump 26 and motor 28. In this exemplary manner, the temperature of fluid in fluid circuit 47 may be estimated for use by controller 62 in the exemplary manner described above to control operation of transmission 22.

Figure 3:
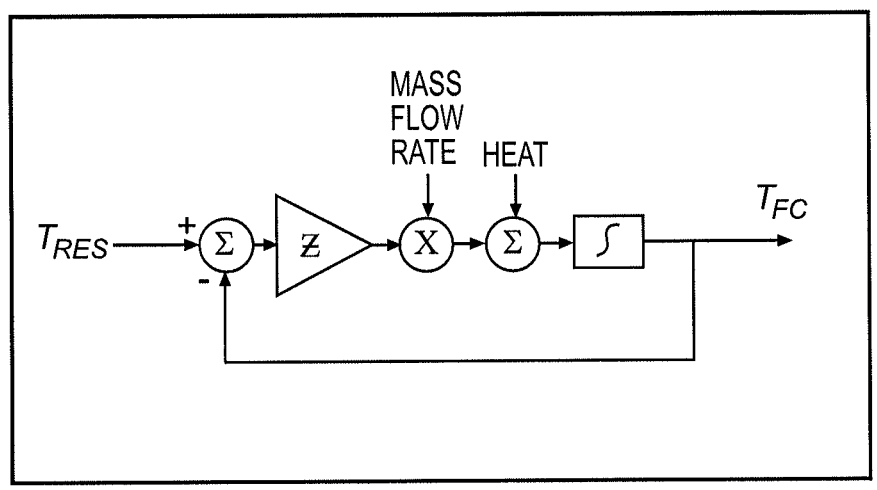
FIG. 3 is an exemplary control diagram for estimating temperature in an exemplary fluid circuit based on the temperature of the fluid in a fluid reservoir.

For example, as shown in the exemplary control diagram of FIG. 3, controller 62 estimates the temperature $T_{FC}$ of the fluid in fluid circuit 47 based on the temperature $T_R$ of the fluid in reservoir 38, a constant term Z related to known parameters of fluid circuit 47, multiplied by the mass flow rate of the fluid in fluid circuit 47, which is added to a term related to the amount of heat being added to fluid circuit 47. The result is integrated to obtain an estimate of the temperature $T_{FC}$ in fluid circuit 47.

INDUSTRIAL APPLICABILITY

Exemplary machine 10 may be used for performing work. In particular, machine 10 may be any ground-borne vehicle, such as, for example, an automobile, a truck, an agricultural vehicle, and/or a construction vehicle, such as, for example, a wheel loader, a dozer, a track-type tractor, an excavator, a grader, an on-highway truck, an off-highway truck, and/or any other vehicle type known to a person skilled in the art.

Exemplary hydraulic system 23 may be configured to control pressure in one or more of hydrostatic transmissions 24 in a manner that maintains the responsiveness of machine 10 over a wider range of operating conditions. For example, controller 62 may permit operation of hydrostatic transmission 24 at elevated pressures for an extended period of time relative to pressure relief systems that rely on pressure alone to control the pressure in a hydrostatic transmission. In particular, if the temperature in fluid circuit 47 is relatively low, controller 62 reduces the rate at which the displacement of pump 26 is reduced. This may permit hydrostatic transmission 24 to continue to operate at relatively high pressure for an extended period, for example, until the temperature of the fluid in fluid circuit 47 reaches an undesirably high level. As a result, machine 10 may continue operate in a relatively more responsive manner. In contrast, if the temperature in fluid circuit 47 is relatively close to the temperature at which the fluid in fluid circuit 47 begins to break down or lose viscosity, controller 62 may respond relatively quickly to reduce the displacement of pump 26 in order to prevent break-down of the fluid and prevent excessive wear rates on the components of hydraulic system 23.

In addition, controller 62 may be configured to estimate the temperature of the fluid in fluid circuit 47. This may provide advantages over directly measuring the temperature of the fluid in fluid circuit 47. For example, additional temperature sensors for measuring the temperature directly increase the cost of the system. Further, it may be difficult to directly measure the temperature due to the heat and pressure associated with the fluid in fluid circuit 47. In addition, temperature sensors extending into fluid lines 46 of fluid circuit 47 create potential leak points. Thus, embodiments where controller 62 estimates temperature may have advantages over systems that receive a signal from direct measurement of the temperature of the fluid in fluid circuits 47.

It will be apparent to those skilled in the art that various modifications and variations can be made to the exemplary disclosed systems, methods, and machine. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A hydraulic system comprising:
a hydraulic transmission including:
a hydraulic pump configured to be coupled to a prime mover,
a hydraulic motor configured to be coupled to an output shaft, and
fluid lines coupling the hydraulic pump to the hydraulic motor to provide a fluid circuit providing flow communication between the hydraulic pump and the hydraulic motor, such that operation of the hydraulic pump provides fluid flow to the hydraulic motor, and the hydraulic motor supplies torque to the output shaft; and
a controller configured to control operation of the hydraulic transmission,
wherein the controller is configured to receive signals indicative of pressure in the fluid circuit and reduce an output of the hydraulic pump when the pressure in the fluid circuit reaches a pressure limit,
wherein a rate of response of the reduction of the output of the hydraulic pump is varied based on a temperature of fluid in the fluid circuit,
wherein the rate of response increases with increased temperature of the fluid in the fluid circuit, and
wherein the rate of response is at a minimum when the temperature of the fluid in the fluid circuit is below a first temperature level, wherein the rate of response is at a maximum when the temperature of the fluid in the fluid circuit reaches a second temperature level, and wherein the first temperature level is less than the second temperature level.

2. The hydraulic system of claim 1, wherein the rate of response increases linearly between the first temperature level and the second temperature level.

3. The hydraulic system of claim 1, further including a temperature sensor associated with the fluid circuit and configured to provide signals indicative of the temperature of the fluid in the fluid circuit.

4. The hydraulic system of claim 1, further including a reservoir configured to contain a supply of fluid for the fluid circuit, and a temperature sensor associated with the reservoir to provide signals indicative of temperature of fluid in the reservoir.

5. The hydraulic system of claim 4, wherein the controller is configured to estimate the temperature of the fluid in the fluid circuit based on the temperature of fluid in the reservoir.

6. The hydraulic system of claim 5, wherein the controller is configured to estimate the temperature of the fluid in the fluid circuit based on a difference of a flow rate of fluid through the hydraulic pump and a flow rate of fluid through the hydraulic motor.

7. The hydraulic system of claim 6, wherein the controller is configured to determine the flow rate of fluid through the hydraulic pump based on signals indicative of speed of the hydraulic pump and displacement of the hydraulic pump, and the controller is configured to determine the flow rate of fluid through the hydraulic motor based on signals indicative of speed of the hydraulic motor and displacement of the hydraulic motor.

8. The hydraulic system of claim 1, wherein the rate of response remains relatively constant when the temperature of the fluid in the fluid circuit is below the first temperature level.

9. A method for controlling a hydraulic system comprising a hydraulic pump, a hydraulic motor, and fluid lines coupled to the hydraulic pump and the hydraulic motor to provide a fluid circuit providing fluid flow between the hydraulic pump and the hydraulic motor, the method including:
receiving a signal indicative of pressure in the fluid circuit; and
reducing output of the hydraulic pump when the pressure in the fluid circuit reaches a pressure limit,
wherein a rate of response of the reduction of the output of the hydraulic pump is varied based on a temperature of fluid in the fluid circuit, and the rate of response increases with increased temperature of the fluid in the fluid circuit, wherein the rate of response is at a minimum when the temperature of the fluid in the fluid circuit is below a first temperature level, wherein the rate of response is at a maximum when the temperature of the fluid in the fluid circuit reaches a second temperature level, and wherein the first temperature level is less than the second temperature level.

10. The method of claim 9, wherein the rate of response increases linearly between the first temperature level and the second temperature level.

11. The method of claim 9, further including receiving signals indicative of the temperature of fluid in the fluid circuit.

12. The method of claim 9, wherein the hydraulic transmission further includes a reservoir configured to contain a supply of fluid for the fluid circuit, and wherein the method includes receiving signals indicative of a temperature of the fluid in the reservoir and estimating the temperature of fluid in the fluid circuit based on the signals indicative of the temperature of the fluid in the reservoir.

13. The method of claim 12, further including receiving signals indicative of a flow rate of fluid through the hydraulic pump and a flow rate of fluid through the hydraulic motor, determining a difference between the flow rate of fluid through the hydraulic pump and the flow rate of fluid through the hydraulic motor, and estimating the temperature of the fluid in the fluid circuit based on the difference.

14. The method of claim 13, wherein the signals indicative of the flow rate of fluid through the hydraulic pump include signals indicative of speed of the hydraulic pump and displacement of the hydraulic pump, and the signals indicative of the flow rate of fluid through the hydraulic motor include signals indicative of speed of the hydraulic motor and displacement of the hydraulic motor.

15. The method of claim 9, wherein the rate of response remains relatively constant when the temperature of the fluid in the fluid circuit is below the first temperature level.

16. A machine comprising:
an operator interface for controlling operation of the machine;
a prime mover for providing power to the machine;
at least two ground engaging members for propelling the machine across terrain;
a hydraulic transmission coupled to the prime mover and the ground engaging members, the hydraulic transmission including:
a hydraulic pump coupled to the prime mover,
a hydraulic motor coupled to at least one of the ground engaging members, and
fluid lines coupling the hydraulic pump to the hydraulic motor to provide a fluid circuit providing flow communication between the hydraulic pump and the hydraulic motor, such that operation of the hydraulic pump provides fluid flow to the hydraulic motor, and the hydraulic motor supplies torque to the ground engaging members; and
a controller configured to control operation of the hydraulic transmission,
wherein the controller is configured to receive signals indicative of pressure in the fluid circuit and reduce an output of the hydraulic pump when the pressure in the fluid circuit reaches a pressure limit, and configured to determine the flow rate of fluid through the hydraulic pump based on signals indicative of speed of the hydraulic pump and displacement of the hydraulic pump, and the controller is configured to determine the flow rate of fluid through the hydraulic motor based on signals indicative of speed of the hydraulic motor and displacement of the hydraulic motor; and
wherein a rate of response of the reduction of the output of the hydraulic pump is varied based on a temperature of fluid in the fluid circuit, wherein the rate of response is at a minimum when the temperature of the fluid in the fluid circuit is below a first temperature level, wherein the rate of response is at a maximum when the temperature of the fluid in the fluid circuit reaches a second temperature level, and wherein the first temperature level is less than the second temperature level.

17. The machine of claim 16, further including a second hydraulic transmission coupled to the prime mover and one of the ground engaging members, the second hydraulic transmission including:
a second hydraulic pump coupled to the prime mover,
a second hydraulic motor coupled to a second of the ground engaging members, and
fluid lines coupling the second hydraulic pump to the second hydraulic motor to provide a second fluid circuit providing flow communication between the second hydraulic pump and the second hydraulic motor, such that operation of the second hydraulic pump provides fluid flow to the second hydraulic motor, and the second hydraulic motor supplies torque to the second ground engaging member.

18. The machine of claim 17, wherein the controller is configured to control operation of the second hydraulic transmission,
wherein the controller is configured to receive signals indicative of pressure in the second fluid circuit and reduce an output of the second hydraulic pump when the pressure in the second fluid circuit reaches a pressure limit, and
wherein a rate of response of the reduction of output of the second hydraulic pump is varied based on a temperature of fluid in the second fluid circuit.

* * * * *